United States Patent [19]

Drain et al.

[11] Patent Number: 4,837,295

[45] Date of Patent: Jun. 6, 1989

[54] EPOXY-AMINE COMPOSITIONS EMPLOYING UNSATURATED IMIDES

[75] Inventors: Kieran F. Drain, Rochester Hills, Mich.; Kris Kadziela, East Hartford, Conn.

[73] Assignee: Loctite Corporation, Newington, Conn.

[21] Appl. No.: 164,075

[22] Filed: Mar. 4, 1988

[51] Int. Cl.$^4$ ............................................. C08G 59/60
[52] U.S. Cl. .................................... 528/111; 525/504; 528/322; 528/96
[58] Field of Search ........................ 528/110, 322, 96; 525/504

[56] References Cited

U.S. PATENT DOCUMENTS

| | | | |
|---|---|---|---|
| 2,895,950 | 7/1959 | Krieble | 260/89.5 |
| 3,218,305 | 11/1965 | Krieble | 260/89.5 |
| 3,425,988 | 2/1969 | Gorman et al. | 260/47 |
| 3,763,087 | 10/1973 | Holub et al. | 260/41 |
| 3,985,928 | 10/1976 | Watanabe et al. | 428/273 |
| 3,988,299 | 10/1976 | Malofsky | 260/27 |
| 4,025,407 | 5/1977 | Chang et al. | 204/159.14 |
| 4,051,195 | 9/1977 | McWhorter | 260/837 |
| 4,092,442 | 5/1978 | Agnihotri et al. | 427/41 |
| 4,110,188 | 8/1978 | Darms et al. | 204/159 |
| 4,115,361 | 9/1978 | Schulze et al. | 528/111 |
| 4,146,701 | 3/1979 | Waddill et al. | 528/111 X |
| 4,147,857 | 4/1979 | Waddill et al. | 528/111 X |
| 4,304,889 | 12/1981 | Waddill et al. | 528/111 X |
| 4,365,068 | 12/1982 | Darms et al. | 548/435 |
| 4,485,229 | 11/1984 | Waddill et al. | 528/111 |
| 4,490,515 | 12/1984 | Mariotti et al. | 526/298 |
| 4,518,749 | 5/1985 | Waddill et al. | 528/111 X |

*Primary Examiner*—Earl Nielsen
*Attorney, Agent, or Firm*—Vidas & Arrett

[57] ABSTRACT

Epoxy resin adhesives in which polyoxyalkylene polyamines are used as curing agents possess significantly improved initial adhesion and thermal shock resistance when mono- or bis-unsaturated cyclic imides are present, e.g. maleimides, bis-maleimides, bicycloheptene discarboximides, and bis-bicyloheptene dicarboximides.

9 Claims, No Drawings

EPOXY-AMINE COMPOSITIONS EMPLOYING UNSATURATED IMIDES

FIELD OF THE INVENTION

This invention relates to adhesive compositions exhibiting excellent adhesion to plastic substrates. More specifically, the compositions exhibit excellent adhesion to engineering plastics such as Valox TM (terphalate polyesters, such as polybutylene terephtalate) and Ryton TM (polyphenylene sulfide). Even more specifically, the inventive compositions produce an adhesive bond that is resistant to the stress of thermal cycling and thermal shock. A significant use of these plastics, and thus for the adhesives, is in the construction of electrical/electronic components.

BACKGROUND OF THE INVENTION

The use of polyoxyalkylene amines as epoxy curatives is well known and is described, for example in U.S. Pat. No. 4,485,229. In U.S. Pat. No. 4,051,195 and copending application Ser. No. 801,984, there are also described formulations of epxxy and polyoxyalkylene amine and which utilize Michael addition of the amine to the acrylic component to provide crosslinking between the epoxy and acrylic components.

It is also known to use polyimides or various functionalized imide compounds, eg., aminoimide compounds, in epoxy formulations, see eg., U.S. Pat. Nos. 3,985,928, 3,763,087, and 4,092,442.

In U.S. Pat. No. 3,988,299 there are described anaerbbic acrylic adhesives which display improved high temperature strength as a result of inclusion of a maleimide or nadimide compound.

In U.S. Pat. No. 4,490,515 there are described cyanoacrylate adhesives with maleimide or nadimide additives having improved strength at elevated temperatures.

While the use of maleimide or nadimide functional compounds as additives to improve hot strength various curable adhesive or related systems has been previously described, applicants are unaware of any prior art suggesting that such additives can result in improved adhesion or thermal cycle resistance (i.e. resistance to loss of adhesion as a result of repeated large temperature changes.)

A major feature of the new engineering plastics that have been used for electronic applications is their thermal and dimensional stability. Thermal coefficients of expansion (TCE) of $<30 \times 10^{-5}$ inch/inch deg C are common. Usually the electrical/electronic component is of composite structure containing plastic, ceramic and metal components. This situation is typified by potentiometers. Adhesive/Potting Compounds are used to encapsulate and protect electrical components from adverse environmental effects such as solvents or moisture. The adhesive component must retain its adhesion throughout the range of service conditions. One of th most severe tests the adhesive must withstand is delamination induced because of the difference TCE's of the construction materials of electrical/electronic component.

Adhesive systems most commonly used to pot/encapsulate and bond electrical/electronic components are one and two-part epoxy resins. The resins are iilled to a high level with mineral fillers, e.g., aluminum trihydrate to reduce shrinkage and TCE. However, these resins do suffer from significant process disadvantages such as slow cure. Moreover, their initial adhesion and thermal cycling properties are still not always entirely satisfactory.

Traditional UV curable acrylic compositions are unsuitable due to high shrinkage on polymerization 8-15% and high TCE (of the order of $90 \times 10^{-5}$ inch/inch deg C).

U.S. patent applications Ser. Nos. 801,984, filed Nov. 26, 1985, 882,670, filed July 7, 1986, now abandoned and 926,312, filed Oct. 31, 1986. describe compositions which exhibit advantages over both epoxies and UV curable acrylics. However, even these new materials can sometimes prove unsuitable for bnnding electrical/electronic components of composite structure where extreme thermal cycling and thermal shock is application requirement, i.e., $-50°$ C. to $165°$ C.

SUMMARY OF THE INVENTION

The inventors have unexpectedly discovered that addition of mono or bis-unsaturated imide compounds to conventional epoxy/amine formulations in which the amine is a polyoxyalkylene polyamine results in significantly improved initial adhesion and thermal shock resistance over similar composttions without maleimide. The key to the thermal cycle resistance appears to be a surprising reduction in modulus of the cured product caused by amine-imide interaction when the polyoxyalkylene polyamine is used. Use of an aromatic amine or an anhydride curing agent with an epoxy and imide formulation does not produce the improved initial adhesion or thermal shock resistance nor does use of imide compounds without unsaturation.

The present invention comprises a amine cured epoxy formulation which displays improved initial and thermal cycle strengths when bonding different materials such as Valox TM and aluminum.

The composition comprises:

(1) a compound or mixture of compounds having a plurality of epoxy groups per molecule;

(2) a polyoxyalkylene amine curative for the epoxy; and (3) an imide compound selected from those having the formulas:

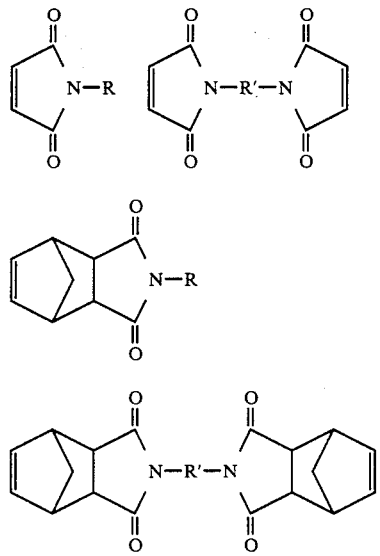

wherein R and R' are, respectively, monovalent and divalent organic groups having 200 or fewer carbon atoms.

A further aspect of the invention comprises a method of bonding differend materials, particularly polyalkylene terephthalate, polyalkylene terephthalate/polycarbonate blends or polyphenylene sulfide and metals of having a high thermal coefficient of expansion such as aluminum or copper using a cureable composition as disclosed above to provide a bonded assembly with improved thermal cycle resistance.

As yet a further aspect of the invention, a composition as described above may be modified by inclusion therein of an ethylenically unsaturated photocureable monomer such as an acrylic monomer and a photoinitiator in amoutts effective to permit the composition to be immobilized on irradiation. Such modified compositions retain the improved initial adhesion and thermal cycle properties of the inventive compositions and additionally permit the formulation to be rapidly immobilied so as to facilitate continuous automated assembly operations.

A still further aspect of the invention comprises electronic components potted in a housing of polybutylene terephthalate, polybutylene terephthalate, polycarbonate blend or polyphenylene sulfide wherein the potting material is one of the cured compositions described above.

DETAILED DESCRIPTION OF THE INVENTION

The epoxy component of the inventive composition is a monomeric, oligomeric or polymeric compound having two or more epoxy groups per molecule. Mixtures of such compounds may also be utilized.

Suitable epoxy resins include those derived from epichlorohydrin and dihydric phenols, e.g., resorcinol, hydroquinone, bisphenol A, p-p'-dihydroxydiphenylethane, bis-(2-hydroxynaphthyl)ethane, and 1,5-dihydroxynaphthalene The epoxy compound may also be a cycloaliphatic epoxy or an epoxidized novolak. Suitable epoxy compounds are describdd in "Handbook of Epoxy Resins" by Lee and Neville, McGraw-Hill Book Co., New York (1967). A diglycidyl ether of bisphenol A (DGEBA) is preferred.

In lieu of the above-described epoxy functional polymerizable monomers, or alternatively in association therewith, various epoxidized rubbers may be utilized in the potting compositions of the invention as the second resin component, such materials being well known in the art.

A useful class of such epoxidized rubbers are epoxidized carboxy terminated butadiene acrylonitrile copolymers sold under the name of Kelpoxy by Spencer Kellogg, and epoxidized polybutadiene, for example Oxiron 2001 commerically available from FMC Corporation. Still other suitable rubber epoxy additives are the various polymers sold by B.F. Goodrich Company under the name HYCAR.

The amine component is limited to polyoxyalkylen amines having two or more aliphatic amino groups per molecule. The polyether backbone is based preferably eiteer on propylene oxide or ethylene oxide or mixtures of the two. Such polyoxyalkylene amines are sold under the trademarks JEFFAMINE ™ and TERATHANE ™.

Preferably, the polyoxyalkylene polyamine have the structure

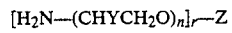

[H$_2$N—(CHYCH$_2$O)$_n$]$_r$—Z wherein Y is hydrogen, a methyl radical or an ethyl radical, Z is a hydrocarbon radical of 2-5 carbon atoms, n is at least one and r is a number greater than or equal to 2.

Especially preferred are polyoxyalkylene polyamines having the general structure:

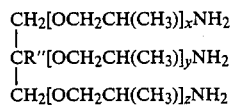

wherein x+y+z are numbers having a total such that the molecular weight of said polyoxyalkylene polyamine is about 400 or more and R" is H or alkyl.

Preferred low molecular weight polyoxyalkylene polyamines have the general structure:

wherein w is a finite number such that the molecular weight of said polyoxyalkylene polyamine is from about 200 to about 300, or of the eeneral structure:

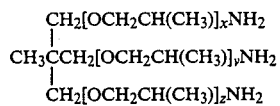

wherein x+y+z are finite numbers having a total such that the molecular weight of said polyoxyalkylene polyamine is about 400.

Preferred high molecular weight polyoxyalkylene polyamines are structures with more than two branches having a molecular weight of 5000 or more.

The amine hardener is used in a stoichiometric equivalent to the epoxy resin.

Suitable olefinic imide adhesion promoters include maleimides and norbornene functionalized imides. Such imides are represented by the formulas:

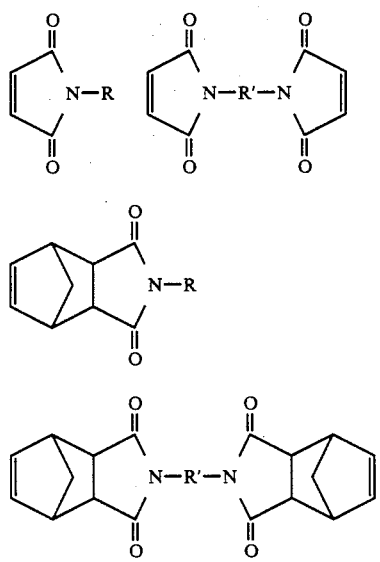

wherein R and R' are respectively monovalent and divalent organic groups. R and R' may be aliphatic or divalent organic gruups aromatic heterocyclic radicals optionally substituted with alkoxy, cyano or other organic groups, or groups consisting of several said radicals. Further R & R' may include non-carbon substituents such as halogens. The R or R' group suitably contains less than 200 carbon atoms, more suitably less than 50 carbon atoms. Generally it is preferred that the imide compound be a bismaleimide and that R' be a $C_2$–$C_{20}$ hydrocarbon group.

Certain of the preferred dimaleimides are shown in the working examples. In addition, specific attention is directed to compounds such as N,N'-ethylenedimaleimide, N,N'-hexamethylenedimaleimide, N,N'-decamethylenedimaleimide, N,N'-dodecamethylenedimaleimide, N,N'-oxydipropylenedimaleimide, ethylenedioxy bis(N-proylmaleimide), N,N'-metaphenylenedimaleimide, N,N'-araphenylenedimaleimide, N,N'-oxy(diparaphenylene) dimaleimide, N,N'-methylene (diaparaphenylene)dimaleimide. N,N'-ethylene(diparaphenylene)dimaleimide, N,N'-sulfo(diparaphenylene)-dimaleimide, N,N'-metaphenylene-bis(paraoxyphenylene)dimaleimide, N,N'-methylene(di-1,4-cyclohexylene)-dimaleimide. N,N'-isopropylidene(di-1,4-cyclohexene)dimaleimide, 2,5oxadiazolylenedimaleimide, N,N-paraphenylene(dimethylene) dimaleimide N,N'-2methylparatolulene dimaleimide, N,N'-hexamethylenedicitraconimide. N,N'-thio(-diphenylene)dicitraconimide. N,N'-methylene(diparaphenylene)-bis(chloromaleimide) and N,N'-hexamethylenebis(cyanomethylmaleimide).

Preferred bismaleimides include 4,4,'-bismaleimidodiphenylmethane (from Ciba Geigy), 1,4 pyrrole-2,5-dione-1,1-(methylenedi-1,4-phenylene) bispolymer with methylene bis(benzamine) (Keramide 1050 from Rhone Poulonc), and 1,1-(methylenedi-4,1phenylene)bismaleimide (from Reichold Chemicals).

Norbornene functionalized imides are described in U.S. patent applicaton Ser. No. 099,676, filed Sept. 21, 1987 and incorporated herein by reference.

The imide component is generally used at a level of 0.1 to 10% with 1 to 5 percent being the preferred levels.

As a further embodiment of the invention the formulation may include a photocurable ethylenically unsaturated compound and a photoinitiator in an amount effective to cause the composition to become immobilized upon irradiation with actinic light.

Suitable unsaturated compounds include (meth)acrylate compounds, vinyl monomers and unsaturated polyesters solubilized in vinyl resins. (Meth)acrylic esters are preferred.

As used here in the term "(meth)acrylic" is intended to be broadly construed to include acrylic as well as methacrylic compounss, e.g., acrylic esters and methacrylic esters.

Useful acrylic resins include esters and amides of (meth)acrylic acid as well as co-monomers thereof with other co-polymerizable monomers. Illustrative esters include methyl acrylate, methyl methacrylate, hydroxy ethyl acrylate, butyl methacrylate, octyl acrylate, and 2-ethoxyethyl acrylate. Illustrative amides include butoxymethyl acrylamide, methacrylamide, and tertbuty acrylamide. Also suitable are copolymers of such compounds, and copolymers with other monomers containing polymerizable vinyl groups. Polyacrylates are generally useful, including 1,3-butylene glycol diacrylate, diethylene glycol diacrylate, 1,6-hexanediol diacrylate, neopentyl glycol diacrylate, polyethylene glycol diacrylate, tetraethylene glycol diacrylate, triethylene glycol diacrylate, pentaerythritol tetraacrylate, tripropylene glycol diacrylate, ethoxylated bisphenol-A-diacrylate, trimethylolpropane dipentaerythritol pentaacrylate, pentaerythritol triacrylate, and the corresponding methacrylate compounds. Also useful are reaction products of (meth)acrylic acid and epoxide resins and urethane acrylic resins. Suitable poly (meth)acrylate ester compounds are also described in U.S. Pat. Nos. 4,051,195; 2,895,950; 3,218,305; and 3,425,988.

It will be understood that the foregoing listing of (meth)acrylic compounds is intended only to be illustrative in character, and that any other resin compounds having (meth)acrylic functionality in their molecules and curable under actinic radiation conditions may be potentially employed.

Among the foregoing compounds, (meth)acrylic acid esters are preferred, with the most preferred compounds being (meth)acrylic acid esters of polyhydric alcohols, such as ethoxylated trimethylolpropane triacrylate and dipentaerythritol monohydroxy pentaacrylate.

Another class of resins which are actinic radiation curable and suitable for use in the compositions in the invention include vinyl monomers such as styrene, vinyl toluene, vinyl pyrrolidone, vinyl acetate, divinyl benzene, and the like.

A further class of actinic radiation curable materials comprises unsaturated polyesters, solubilized in vinyl monomers, as ordinarily prepared from alphabeta ethylenically unsaturated polycarboxylic acids and polyhydric alcohols. Such polyesters are described for example in U.S. Pat. No. 4,025,407.

As used herein, "actinic radiation" means electromagnetic radiation havingaa wavelength of about 700 nm or less which is capable, directly or indirectly, of curing the specified resin component of the potting composition. By indirect curing in this context is meant curing under such electromagnetic radiation conditions as initiated, promoted or otherwise mediated by another compound.

Suitable photoinitiators useful with ultraviolet (UV) actinic radiation curing of (meth)acrylic and vinyl monomers include free radical generating UV initiators such as benzophenone, diethoxy-acetophenone, benzoin methyl ether, benzoin ethyl ether, benzoin isopropyl ether, diethoxyxanthone, chlorothioxanthone, azo-bis-isobutyronitrile, N-methyl diethanolaminebenzophenone, and mixtures thereof.

In addition, the combnnation of a hydroperoxide, such as cumene hydroperoxide, with a $\eta^6$, $\eta^5$-arene complex as described in U.S. patent application Ser. No. 918,005 of Woods et al., filed Oct. 14, 1986, now abandoned and incorporated herein by reference, is suitable and in fact preferred as the photoinitiator. Such combinations are useful with both UV and visible irradiation.

Visible light initiators include camphoroquinone/-peroxyester initiators and 9-fluorene carboxylic acid peroxyesters.

Infrared initiators also include cumeme hydroperoxide benzoyl peroxide, azobisisobutyronitrile, and like azo and peroxide compounds.

The amount of the photoinitiator required for a given composition may be readily determined by the expedient of simple experiment, without undue effort. In general, however, in the case of (meth)acrylic and vinyl first resin components, amounts of photoinitiator on the order of about 0.1-10 percent by weight, and prefeaably about 0.5-5 percent by weight, based on the weight of the total resin, have been found satisfactory.

The amount of the unsaturated component may constitute 50% of the weight of the total composition. Preferably the level of the first resin component is between 0.1 and 20% based on the weight of the total composition, and more preferably between 5 and 15%.

It is particularily suprising that the advantages of the invention are still obtained when (meth)acrylic or other vinyl resins capable of Michael addition to the amine component are employed in the inventive epoxy compositions. The competing reactions for amine between epoxy and imide are further complicated by the addition of the reactive acrylic or similar groups. While an increase in thermal decomposition resistance might be expected, it would also be expected that addition of the imide would cause an increase in the rigidity of the cured formulation with a consequent decrease in thermal shock resistance. Use of an acrylic resin would be expected to make this problem worse. Instead, addition of the imide dramaticaly decreases the modulus and increases elongation at break. Apparently the imide reduces rather than increases the crosslink density of the cured product.

The advantages of the invention are further illustrated with respect to the following non-limiting examples, wherein all parts and percentages are by weight unless otherwise expressly stated and all references to Valox TM pertain to Valox TM 420 SEO, a filled polybutylene terephthalate containing a minor amount of polycarbonate.

EXAMPLE 1

This example illustrates the advantages of the invention over comparable compositions which do not include the imide component.

The adhesive compositions of Table I were prepared and the respective parts mixed and applied to lap shear specimens (as per ASTM D1002). Cure of the compositions was effected at 250° F. for 15 minutes. Tensile shear strengths were obtained on samples aged at room temperature and on samples thermally shocked by subjecting them to 10 cycles of −55° to 125° C. The results are set forth in Table I.

TABLE I

| | COMPOSITION | |
|---|---|---|
| | 1 | 2 |
| Part A | | |
| Diglycidyl ether bisphenol A (Dow Quatrex 1010) | 80.0 | 80.0 |
| Part B | | |
| Polyoxypropylenamine (Texaco Jeffamine D230) | 25.0 | 20.0 |
| Keramide 1050 (Rhone Poulonc) | 0.0 | 5.0 |
| Mix Ratio | | |
| (A/B) | 80/25 | 80/25 |
| Tensile Shear Strength (psi) ASTM D1002 | | |
| Substrate | | |
| Valox TM to Aluminum | | |
| Room temp aged | 855 | 1486 |
| Thermal Shocked (10 cycles −55° to 125° C.) | 0 | 798 |

EXAMPLE 2

In this example, the formulations in Table II were prepared and used as potting compositions for variable resistance type potentiometers. The potentiometer was a model 3006 Industrial Cermet Trimpot potentiometer commerically available from Bourns, Inc. (Riverside, CA), and had a housing of Valox polybutylene terephthalate.

Part A and B for compositions 3 and 4, Table II were mixed by extrusion through static mixing elements. Potentiometers were potted with both mixed compositions and the potting compositions cured under 5 seconds irradiation at 100,00 microwatts per square centimeter, 360 nanometers wavelength, followed by oven curing at 250° F. for 15 minutes.

Microscopic examination X30 of components potted with either composition revealed no evidence of delamination of the potting materials from the component housing.

Thermal shocking of the components was carried out, 10 cycles of −55° to 125° C. Subsequently on reexamination of the components, delamination was evident in those components potted with composition 3, whereas no delamination was evident for components potted with composition 4.

This example illustrates how incorporation of the bismaleimide confer improved thermal cycle resistance to the potting composition. The improved thermal cycle resistance is believed to be due to the suprisingly lower modulus of composition 4.

TABLE II

| | COMPOSITION | |
|---|---|---|
| | 3 | 4 |
| Part A | | |
| Diglycidyl ether bisphenol A (Dow Quatrex 1010) | 75.3 | 75.3 |
| Dipentaerythritol monohydroxy pentaacrylate (Sartomer SSR399) | 21.2 | 21.2 |
| 1 - benzoyl cyclohexanol | 3.0 | 3.0 |
| 4.4'-Bismaleimidodiphenylmethane (Matrimide 5292, Ciba Geigy) | 0.0 | 10.0 |
| Organic Air Release Agent (Byk Asol Byk Malinkrodt) | 0.5 | 0.5 |
| Part B | | |
| Polyoxypropylenamine (Texaco Jeffamine D230) | 23.8 | 23.8 |
| Aluminum Oxide | 66.2 | 66.2 |
| Silicon Dioxide | 2.0 | 2.0 |
| C14 Aliphatic Diacrylate (Sartomer Chemlink C2000) | 8.0 | 8.0 |
| Mix Ratio | | |
| (A/B) | 1/1 | 1.1/1 |
| Mechanical and Electrical Properties | | |
| Tensile Strength | 2582 | 642 |
| Modulus | 205,07 | 1859 |
| % Elongation at Break | 9.4 | 38.4 |
| Hardness Shore D | 83 | 47 |
| Surface Resistivity (ohms) | $6 \times 10^{14}$ | $1.9 \times 10^{14}$ |
| Volume Resistivity (ohm-cm) | $6 \times 10^{14}$ | $8.3 \times 10^{13}$ |

EXAMPLE 3

The adhesive compositions of Table III were prepared and respective Parts A and B mixed and applied to lap shear specimens (as per ASTM D1002). Adhesive lap shear bonds were prepared and cure of the compositions was effected by heat curing at 250° F. for 10 minutes. It can be seen from the results in Table III that Composition 6 of Table III offers improved thermal cycle resistance over Composition 5 of Table III, and that Composition 7 of Table III offers further improved thermal cycle resistance over Composition 5 and, in addition, improved adhesion on unaged samples over Composition 5 of Table III. This illustrates the improved thermal shock resistance resulting from the use of maleimides on differential substrate bonding. The improvement is more pronounced with a bismaleimide over the simple N-phenylmaleimide.

Compositions 6 and 7 thus offer advantages over Composition 5 in potting or bonding on differential substrates.

TABLE III

| | COMPOSITION | | |
|---|---|---|---|
| | 5 | 6 | 7 |
| Part A | | | |
| Diglycidyl ether bisphenol A (Dow Quatrex 1010) | 75.3 | 75.3 | 75.3 |
| Dipentaerythritol monohydroxy pentaacrylate (Sartomer SSR399) | 21.2 | 21.2 | 21.2 |
| 1 - benzoyl cyclohexanol | 3.0 | 3.0 | 3.0 |
| Keramide 1050 (Rhone Poulonc) | 0.0 | 0.0 | 10.0 |
| N—phenyl maleimide (Imilex TM -P) | 0.0 | 10.0 | 0.0 |
| Organic Air Release Agent (Byk Asol Byk Malinkrodt) | 0.5 | 0.5 | 0.5 |
| Part B | | | |
| Polyoxypropyleneamine (Texaco Jeffamine D230) | 23.8 | 23.8 | 23.8 |
| Aluminum Oxide | 66.2 | 66.2 | 66.2 |
| Silicon Dioxide | 2.0 | 2.0 | 2.0 |
| C14 Aliphatic Diacrylate (Sartomer Chemlink C2000) | 8.0 | 8.0 | 8.0 |
| Mix Ratio | | | |
| (A/B) | 1/1 | 1.1/1 | 1.1/1 |
| Tensile Shear Strengths (psi) ASTM D1002 | | | |
| Substrate | | | |
| Valox TM to Aluminum | | | |
| Room temperature aged | 594 | 521 | 737 |
| Thermal Shocked 10 cycles −55° to 125° C. | 0 | 115 | 540 |

EXAMPLE 4

The adhesive compositions of Table IV were prepared and respective Parts A and B mixed, and the mixtures applied to lap shear specimens as per ASTM D1002. Adhesive lap shear bonds were prepared and cure of the compositions effected by heat curing at 250x F. for 15 minutes. It can be seen from the results in Table IV that Composition 9 of Table IV offers equivalent or better adhesive performance on all the substrates tested, and offers significantly improved thermal shock resistance over Composition 8. This example illustrates the effectiveness of imides with suitable terminal unsaturation other than maleimides. Composition 10, however, offered no improvement and these results illustrate that a nonfunctional polyimide is not effective in the invention.

TABLE IV

| | COMPOSITION | | |
|---|---|---|---|
| | 8 | 9 | 10 |
| Part A | | | |
| Diglycidyl ether bisphenol A (Dow Quatrex 1010) | 5.3 | 75.3 | 75.3 |
| Dipentaerythritol monohydroxy pentaacrylate (Sartomer SSR399) | 21.2 | 21.2 | 21.2 |
| 1 - benzoyl cyclohexanol | 3.0 | 3.0 | 3.0 |
| Bis-methylnadimide of 1,3-phenylene diamine | 0.0 | 10.0 | 0.0 |
| Nonfunctional imide (Matrimide 5218, Ciba Geigy) | 0.0 | 0.0 | 10.0 |
| Organic Air Release Agent (Byk Asol Byk Malinkrodt) | 0.5 | 0.5 | 0.5 |
| Part B | | | |
| Polyoxypropylenamine (Texaco Jeffamine D230) | 23.8 | 23.8 | 23.8 |
| Aluminum Oxide | 66.2 | 66.2 | 66.2 |
| Silicon Dioxide | 2.0 | 2.0 | 2.0 |
| C14 Aliphatic Diacrylate (Sartomer Chemlink C2000) | 8.0 | 8.0 | 8.0 |
| Mix Ratio | | | |
| (A/B) | 1/1 | 1.1/1 | 1.1/1 |
| Tensile Shear Strengths (psi) ASTM D1002 | | | |
| Substrate | | | |
| Valox TM to Aluminum | | | |
| Room temperature aged | 594 | 628 | 191 |
| Thermal Shocked 10 cycles −55°–125° C. | 0 | 284 | 0 |
| Ryton TM to glass | 176 | 189 | 296 |
| Ryton TM to aluminium | 323 | 325 | 364 |
| Valox TM to glass | 771 | 846 | 681 |

EXAMPLE 5

The adhesive compositions of Table V were prepared, equal weights of respective Parts A and B mixed, and the mixtures applied to lap shear specimens as per ASTM D1002. Cure of the compositions effected by heat curing at 250° F. for 10 minutes. It can be seen from the results in Table V that the use of the maleimide had no beneficial effect when used with an anhydride cured epoxy composition confirming the need for an amine hardner for the epoxy resin.

TABLE V

| | COMPOSITION | |
|---|---|---|
| | 11 | 12 |
| Part A | | |
| Cryacure 6110 (Union Carbide) cycloaliphatic bis-epoxide | 29.4 | 29.9 |
| Cryacure 6351 (Union Carbide) cycloaliphatic bis-epoxide | 48.7 | 46.3 |
| Dipentaerythritol monohydroxy pentaacrylate (Sartomer SSR399) | 18.5 | 17.6 |
| Dietoxyacetophenone | 2.9 | 2.8 |
| Keramide 1050 (Rhone Poulonc) | 0.0 | 5.0 |
| Organic Air Release Agent (Byk Asol Byk Malinkrodt) | 0.5 | 0.5 |
| Part B | | |
| ACDP-1 Anhydride blend (Anhydrides and Chemicals) | 80.0 | 76.0 |
| Dipentaerythritol monohydroxy-pentaacrylate | 20.0 | 19.0 |
| Keramide 1050 (Rhone Poulonc) | 0.0 | 5.0 |
| Mix Ratio | | |
| (A/B) | 1/1 | 1/1 |
| Tensile Shear Strength (psi) ASTM D1002 | | |
| Substrate | | |
| Valox TM to glass | 88 | 66 |
| Valox TM to Aluminum | | |
| Room temp aged | 75 | 136 |
| Thermally Shocked 10 cycles −55° to 125° C. | 0 | 0 |

EXAMPLE 6

The adhesive compositions of Table VI were prepared, mixed, applied to lap shear specimens and cured as in EXAMPLES 3-5. It can be seen from the results in Table VI that the substitution of an aromatic amine for the polyoxyalkylene amine produces a cured composition with no significant beneficial effect on thermal shock resistance.

TABLE VI

| | COMPOSITION | |
|---|---|---|
| | 13 | 14 |
| Part A | | |
| Diglycidyl ether bisphenol A (Dow Quatrex 1010) | 75.3 | 75.3 |
| Dipentaerythritol monohydroxy pentaacrylate (Sartomer SSR399) | 21.2 | 21.2 |
| 1 - benzoyl cyclohexanol | 3.0 | 3.0 |
| Keramide 1050 (Rhone Poulonc) | 10.0 | 10.0 |
| Organic Air Release Agent (BYK Asol 501, Malinkrodt) | 0.5 | 0.5 |
| Part B | | |
| Polyoxypropylenamine (Texaco Jeffamine D230) | 23.8 | 0 |
| Aromatic Amine (Ciba Geigy XUHY 350) | 0 | 23.8 |
| Aluminum Oxide | 66.2 | 66.2 |
| Silicon Dioxide | 2.0 | 2.0 |
| C14 Aliphatic Diacrylate (Sartomer Chemlink C2000) | 8.0 | 8.0 |
| Mix Ratio | | |
| (A/B) | 1.1/1 | 1.1/1 |
| Tensile Shear Strength (psi) ASTM D1002 | | |
| Substrate | | |
| Valox ™ to Aluminum | | |
| Room temp aged | 737 | 534 |
| Thermal Shocked 10 cycles −55°-125° C. | 540 | 83 |

EXAMPLE 7

On mixing equal parts of parts A and B below, a mixture is produced which, when applied to potentiometer assemblies (i.e. Mepco Electra) and cured according to the cure schedule below, gives a seal which can withstand extensive thermal shock of −60° C. to 150° C. without showing any delamination from the Valox housing or any cracking within the sealant material.

| Part A | |
|---|---|
| Diglycydylether of Bisphenol A | 34.78% |
| EPI-REX 5048 (aliphatic triglycidyl ether) | 34.78 |
| 1-Benzoyl Cyclohexanol | 1.83 |
| BYK 052 wetting agent | 0.18 |
| dipentaerythritol monohydroxy pentaacrylate (Sartomer, SR399) | 19.22 |
| Pennco Black dispersion (Carbon black in TRPDGA* 20% w) | 0.40 |
| Keramide 1050 (Rhone-Poulenc) | 9.15 |
| Part B | |
| Jeffamine D230 (polyoxypropylene diamine) | 23.8 |
| Sartomer SR2000 (C14 aliphatic diol diacrylate) | 8.0 |
| Silicon dioxide | 1.0 |
| Alumina | 67.2 |

*tripropylene glycol diacrylate
Cure Schedule:
Immobilization    10 sec UV 70,000 W cm²
Cure    10 minutes 250° F.

While preferred and illustrative embodiments of the invention have been described, it will be appreciated by those skilled in the art that numerous modifications, variations and other embodiments are possible, and accordingly all such apparent embodiments are to be regarded as being within the scope of the invention which is defined as set forth in the accompanying claims.

What is claimed is:

1. A composition comprising:
   (1) a compound or mixture of compounds having a plurality of epoxy groups per molecule;
   (2) a polyoxyalkylene amine curative for the epoxy; and
   (3) an imide compound selected from those having the formulas:

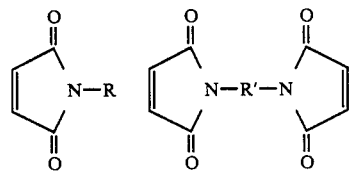

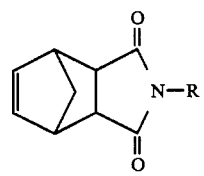

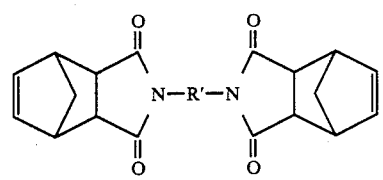

wherein R and R' are, respectively, monovalent and divalent organic groups having 200 or fewer carbon atoms.

2. A composition as in claim 1 wherein the epoxy component is selected from the group consisting of resins derived from epichlorohydrin and dihydric phenols, cycloaliphatic epoxys, epoxidized novolacs and epoxidized rubbers.

3. A composition as in claim 1 wherein the epoxy component is a diglycidyl ether of bisphenol A.

4. A composition as in claim 1 wherein the polyoxyalkylene amine is represented by the structure:

[H₂N—(CHYCH₂O)$_n$]$_r$—Z wherein Y is hydrogen, a methyl radical or an ethyl radical, Z is a hydrocarbon radical of 2-5 carbon atoms, n is a least one and r is a number greater than or equal to 2.

5. A composition as in claim 4 wherein the r is greater than 2 and the molecular weight of the polyoxyalkylene amine is 5,000 or more.

6. A composition as in claim 1 wherein the imide is selected from the group consisting of N,N'-ethylenedimaleimide, N,N'-hexamethylenedimaleimide, N,N'-decamethylenedimaleimide, N,N'-dodecamethylenedimaleimide, N,N'-oxydipropylenedimaleimide, ethylenedioxy bis(N-propylmaleimide), N,N'-metaphenylenedimaleimide, N,N'paraphenylenedimaleimide, N,N'-oxy(diparaphenylene) dimaleimide, N,N'-methylene (diaparaphenylene)dimaleimide. N,N'-ethylene(diparaphenylene)dimaleimide, N,N,'-sulfo(diparaphenylene)-dimaleimide, dimaleimide, N,N'-metaphenylene-bis(paraoxyphenylene)dimaleimide, N,N'-methylene(di-1,4-cyclohexylene)-dimaleimide. N,N'-isopropylidene(di-1,4-cyclohexene)dimaleimide, 2,5-oxadiazolylenedimaleimide, N,N'-paraphenylene(dimethylene) dimaleimide N,N'-2-methylparatolulene dimaleimide, N,N'-hexamethylenedicitraconimide. N,N'-thio(diphenylene)dicitraconimide. N,N'-methylene(diparaphenylene)-bis(chloromaleimide) and N,N'-hexamethylenebis(cyanomethylmaleimide).

7. A composition as in claim 1 wherein the imide is selected from the group consisting of 4,4'-bis-maleimidodiphenylmethane) 1,4 pyrrole-2,5-dione-1,1-(methylenedi-1,4-phenylene) bis-polymer with methylene bis(benzamine) and 1,1-(methylenedi-4,1-phenylene)bismaleimide.

8. A composition as in claim 1 wherein the imide component is present in the range of 0.1–10%.

9. A composition as in claim 8 wherein the imide component is present in the range of 1–5%.

* * * * *

UNITED STATES PATENT AND TRADEMARK OFFICE
CERTIFICATE OF CORRECTION

PATENT NO. : 4,837,295
DATED : June 6, 1989
INVENTOR(S) : Kieran F. Drain and Kris Kadziela It is certified that error appears in the above-identified patent and that said Letters Patent is hereby corrected as shown below:

```
Col. 1, line 23, delete "epxxy" and insert - epoxy -
Col. 1, line 58, delete "th" and insert - the -
Col. 1, line 65, delete "iilled" and insert - filled -
Col. 2, line 24, delete "composttions" and insert - compositions -
Col, 3, line 16, delete "amoutts" and insert - amounts -
Col. 3, line 20, delete "immobilied" and insert - immobilized -
Col. 3, line 42, delete "describdd" and insert - described -
Col. 3, line 63, delete "eiteer" and insert - either -
Col. 5, line 3,  delete "gruups" and in sert - groups -
Col. 5, line 19, delete "araphenylenedimaleimide" and
                       insert - paraphenylenedimaleimide -
Col, 6, line 37, delete "havingaa" and insert - having a -
Col, 6, line 52, delete "combnnation" and insert - combination -
Col. 7, line 2,  delete "prefeaably" and insert - preferably -
Col. 11, line 3, delete "s" and insert - as
```

Signed and Sealed this

Second Day of January, 1990

Attest:

JEFFREY M. SAMUELS

*Attesting Officer*   *Acting Commissioner of Patents and Trademarks*

UNITED STATES PATENT AND TRADEMARK OFFICE
CERTIFICATE OF CORRECTION

PATENT NO. : 4,837,295
DATED : June 6, 1989
INVENTOR(S) : Kieran F. Drain

It is certified that error appears in the above-indentified patent and that said Letters Patent is hereby corrected as shown below:

Column 5, line 2, delete "or"

Column 5, line 3, delete "divalent organic groups aromatic" and insert therefor -- , aromatic or --

Column 6, line 50, delete "diethanolaminebenzophe-" and insert therefor -- diethanolamine/benzophe-"

Signed and Sealed this

Eighteenth Day of October, 1994

Attest:

BRUCE LEHMAN

Attesting Officer     Commissioner of Patents and Trademarks